US012684436B2

(12) United States Patent
Li et al.

(10) Patent No.: US 12,684,436 B2
(45) Date of Patent: Jul. 14, 2026

(54) INFORMATION REPORTING METHOD AND APPARATUS, EQUIPMENT AND STORAGE MEDIUM

(71) Applicant: GUANGDONG OPPO MOBILE TELECOMMUNICATIONS CORP., LTD., Dongguan (CN)

(72) Inventors: Haitao Li, Dongguan (CN); Yi Hu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 461 days.

(21) Appl. No.: 18/100,189

(22) Filed: Jan. 23, 2023

(65) Prior Publication Data

US 2024/0031886 A1 Jan. 25, 2024

Related U.S. Application Data

(63) Continuation of application No. PCT/CN2020/106588, filed on Aug. 3, 2020.

(51) Int. Cl.
*H04W 36/00* (2009.01)
*H04W 36/08* (2009.01)

(52) U.S. Cl.
CPC ..... *H04W 36/0085* (2018.08); *H04W 36/083* (2023.05)

(58) Field of Classification Search
CPC .... H04B 7/185; H04B 7/1851; H04B 7/1853; H04B 7/18532; H04B 7/18539; H04B 7/18541; H04B 7/1855; H04W 36/08; H04W 36/083; H04W 36/085; H04W 36/0085; H04W 36/0088; H04W 36/0094; H04W 84/00; H04W 84/005; H04W 84/04; H04W 84/06

See application file for complete search history.

(56) References Cited

U.S. PATENT DOCUMENTS

| | | | | |
|---|---|---|---|---|
| 2019/0350023 A1* | 11/2019 | Novlan | ........... | H04L 5/16 |
| 2022/0030532 A1* | 1/2022 | Hajir | ......... | H04B 7/18513 |
| 2023/0023056 A1* | 1/2023 | Ma | ........ | H04L 5/0048 |

(Continued)

FOREIGN PATENT DOCUMENTS

| | | |
|---|---|---|
| CN | 108112281 A | 6/2018 |
| CN | 108243391 A | 7/2018 |

(Continued)

OTHER PUBLICATIONS

InterDigital Inc., "Report of Email Discussion [107#62][NR/NTN] TP Mobility", R2-1913604, 3GPP RAN WG2 Meeting #107bis Chongqing, China, Oct. 14-Oct. 18, 2019.

(Continued)

*Primary Examiner* — Matthew W Genack
(74) *Attorney, Agent, or Firm* — BAYES PLLC

(57) ABSTRACT

An information reporting method includes: reporting, by a terminal, a first timing difference to a serving cell base station, where the first timing difference is a difference between a first propagation delay and a second propagation delay, the first propagation delay is a propagation delay between the terminal and a serving cell satellite, and the second propagation delay is a propagation delay between the terminal and a neighboring cell satellite.

18 Claims, 3 Drawing Sheets

Satelliete 14   Satelliete 14

Inter-satellite Link

Service Link

Feeder Link

Feeder Link

UE 12

Gateway Device 16

Data Network 18

(56) References Cited

U.S. PATENT DOCUMENTS

| | | | |
|---|---|---|---|
| 2023/0050226 A1 | 2/2023 | Wycoff | |
| 2024/0040457 A1 | 2/2024 | Hong | |
| 2024/0098588 A1 | 3/2024 | Da Silva et al. | |
| 2024/0406816 A1* | 12/2024 | Deenoo | H04B 7/18513 |

FOREIGN PATENT DOCUMENTS

| | | |
|---|---|---|
| CN | 109041098 A | 12/2018 |
| CN | 110536341 A | 12/2019 |
| CN | 110809292 A | 2/2020 |
| CN | 111278042 A | 6/2020 |
| CN | 115669055 A | 1/2023 |
| KR | 20200066167 A | 6/2020 |

OTHER PUBLICATIONS

Huawei et al., "Discussion on SSB measurement in NTN", R2-1915189, 3GPP TSG-RAN2 Meeting #108 Reno, USA, Nov. 18-22, 2019.

Thales, "Solutions for NR to support non-terrestrial networks (NTN)", RP-193234, 3GPP TSG RAN meeting #86 Sitges, Spain, Dec. 9-13, 2019.

International Search Report issued in International application No. PCT/CN2020/106588, mailed Apr. 30, 2021.

Written Opinion of the International Searching Authority issued in International application No. PCT/CN2020/106588, mailed Apr. 29, 2021.

Extended European Search Report issued in corresponding European application No. 20948001.1, mailed Sep. 5, 2023.

3GPP TR 38.821 V16.0.0 (Dec. 2019); Solutions for NR to support non-terrestrial networks (NTN) (Release 16).

CATT, "The Impact by Propagation Delay Difference on Connected Mode", 3GPP TSG-RAN WG2 Meeting #107 Prague, Czech Republic, Aug. 26-30, 2019; R2-1908755.

Notice of Allowance issued in corresponding European application No. 20948001.1, mailed Jun. 24, 2024.

Priority Review issued in corresponding Chinese application No. 202310386659.4, mailed Jul. 1, 2024.

First Office Action issued in corresponding Chinese application No. 202310386659.4, mailed Jul. 25, 2024.

Supplementary European Search Report issued in corresponding European Application No. 21918483.5 dated Feb. 8, 2024, 12 pages.

International Search Report issued in corresponding International Application No. PCT/CN2021/071931, dated Oct. 12, 2021, 30 pages.

Written Opinion of the International Search Authority issued in corresponding International Application No. PCT/CN2021/071931, dated Oct. 12, 2021, 7pages.

Non-final Office action issued in corresponding U.S. Appl. No. 18/198,012, mailed on Jul. 16, 2025, 13 pages.

Discussion on mobility management for connected mode UE in NTN, Agenda Item: 8.10.3.2, Source: Oppo, 3GPP TSG-RAN WG2 Meeting #111-e, R2-2006784, Electronic, Aug. 17-28, 2020, 4 pages.

3rd Generation Partnership Project; Technical Specification Group Radio Access Network; NR; Radio Resource Control (RRC) protocol specification (Release 16), 3GPP TS 38.331 V16.2.0 (Sep. 2020), 921 pages.

* cited by examiner

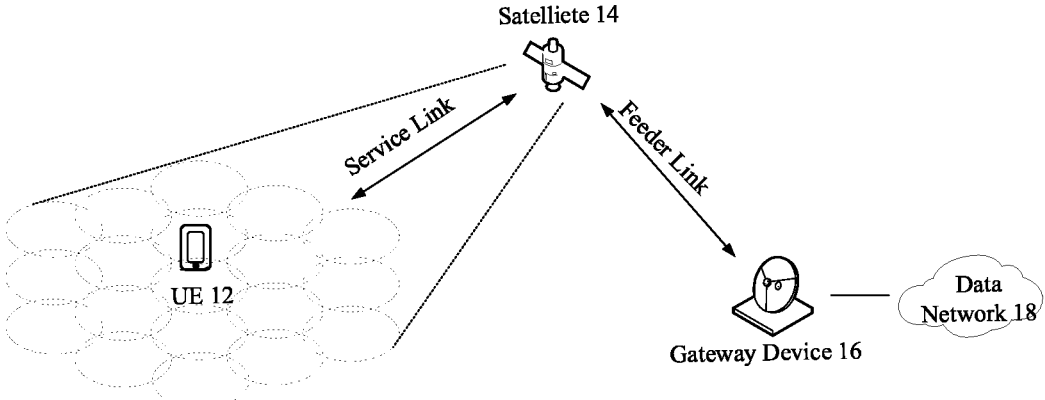

FIG. 1

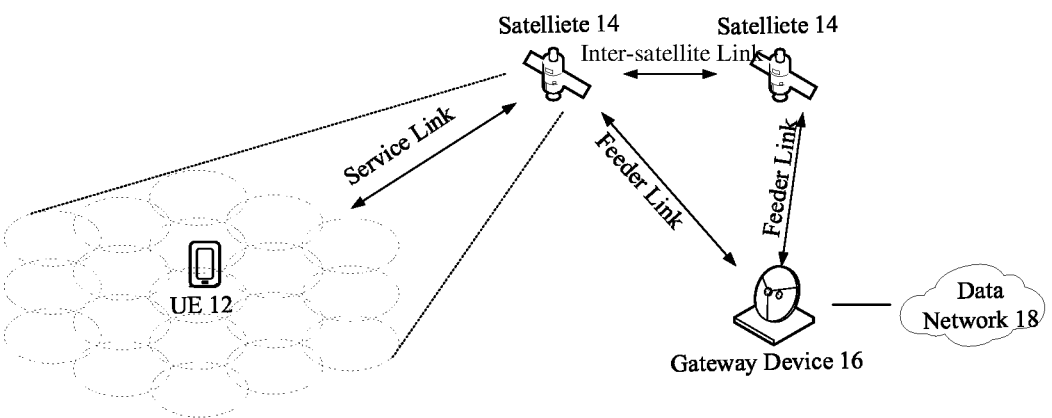

FIG. 2

A UE REPORTS A FIRST TIMING DIFFERENCE TO A SERVICE CELL BASE STATION, WHEREIN THE FIRST TIMING DIFFERENCE IS THE DIFFERENCE BETWEEN A FIRST PROPAGATION DELAY AND A SECOND PROPAGATION DELAY,THE FIRST PROPAGATION DELAY IS THE PROPAGATION DELAY BETWEEN THE UE AND A SERVICE CELL SATELLITE, AND THE SECOND PROPAGATION DELAY IS THE PROPAGATION DELAY BETWEEN THE UE AND A NEIGHBORING CELL SATELLITE     ⌐∼ 310

FIG. 3

UE reports the change pattern of the first timing difference to the serving cell base station     ⌐∼ 410

FIG. 4

INFORMATION REPORTING METHOD AND APPARATUS, EQUIPMENT AND STORAGE MEDIUM

CROSS-REFERENCE TO RELATED APPLICATION

This application is a continuation of International Application No. PCT/CN2020/106588, filed Aug. 3, 2020, entitled "INFORMATION REPORTING METHOD AND APPARATUS, EQUIPMENT AND STORAGE MEDIUM," which is hereby incorporated by reference in its entirety.

TECHNICAL FIELD

This application relates to the field of wireless communication technologies, and in particular, to a method, an apparatus, a device for reporting information, and a storage medium.

BACKGROUND

In a traditional terrestrial cellular system, the coverage radius of a cell is small, and the signal propagation delay between the UE (User Equipment) and the base station of the serving cell is very slightly different from that between the UE and the base station of the neighboring cell. Accordingly, the difference in the signal propagation delay between the UE and the base stations of different cells may be compensated by configuring the duration of SMTC (SS/PBCH block Measurement Timing Configuration), so as to ensure that the UE receives SSBs (Synchronization Signal Blocks) of different cells within the SMTC duration. At the same time, by configuring the duration of the measurement interval, it may be ensured that the UE's measurements on all inter-frequency/inter-RAT (Radio Access Technology) frequency points fall within the measurement interval.

However, in an NTN (Non Terrestrial Network) system, a communication service is generally provided to the UE by means of satellite communication. Compared with the cellular network, while the NTN increases the network coverage, the signal propagation delays between the UE and the satellites in different cells are also quite different.

Therefore, in the NTN system, there is an urgent need for a method for determining the propagation delays between the UE and satellites in different cells, thereby assisting the base station of the serving cell to configure the measurement interval and the SMTC offset value of the neighboring cell.

SUMMARY

Embodiments of this application provide a method, an apparatus, a device for reporting information, and a storage medium, enabling the UE to measure and determine the transmission delay of satellites in neighboring cells, and report the timing difference of satellites in neighboring cells to the base station in the serving cell, thereby facilitating the base station in the serving cell to timely adjust the offset value(s) of the measurement interval and/or the SMTC configured for the neighboring cell. The technical solution is as follows.

In an aspect, an information reporting method is provided, which is applied to a terminal (e.g., UE) and includes:

reporting, by a terminal, a first timing difference to a serving cell base station, wherein the first timing difference is a difference between a first propagation delay and a second propagation delay, the first propagation delay is a propagation delay between the terminal and a serving cell satellite, and the second propagation delay is a propagation delay between the terminal and a neighboring cell satellite.

In another aspect, an information reporting method is provided, which is applied to a base station and includes:

receiving, by a serving cell base station, a first timing difference reported by a terminal, wherein the first timing difference is a difference between a first propagation delay and a second propagation delay, the first propagation delay is a propagation delay between the terminal and a serving cell satellite, and the second propagation delay is a propagation delay between the terminal and a neighboring cell satellite; and configuring, according to the first timing difference, a first offset value for a measurement interval of a neighboring cell and/or a second offset value for a SMTC of the neighboring cell.

In another aspect, an information reporting apparatus is provided and includes:

a first reporting module, configured to report a first timing difference from a terminal to a serving cell base station, wherein the first timing difference is a difference between a first propagation delay and a second propagation delay, the first propagation delay is a propagation delay between the terminal and a serving cell satellite, and the second propagation delay is a propagation delay between the terminal and a neighboring cell satellite.

In another aspect, an information reporting apparatus is provided and includes:

a first receiving module, configured to receive, at a serving cell base station, a first timing difference reported by a terminal, wherein the first timing difference is a difference between a first propagation delay and a second propagation delay, the first propagation delay is a propagation delay between the terminal and a serving cell satellite, and the second propagation delay is a propagation delay between the terminal and a neighboring cell satellite; and a configuring module, configured to configure, according to the first timing difference, a first offset value for a measurement interval of a neighboring cell and/or a second offset value for a synchronization block measurement timing configuration (SMTC) of the neighboring cell.

In another aspect, a UE is provided and includes a processor and a memory, where the memory stores at least one instruction used for being executed by the processor to implement the method executed by the UE according to any aspect as described above.

In another aspect, a base station is provided and includes a processor and a memory, where the memory stores at least one instruction used for being executed by the processor to implement the method executed by the serving cell base station according to any aspect as described above.

In another aspect, a computer-readable storage medium is provided and stores instructions thereon, where the instructions are used for, when being executed by a processor, implementing the method executed by the UE according to any aspect as described above.

In another aspect, a computer-readable storage medium is provided and stores instructions thereon, where the instructions are used for, when being executed by a processor, implementing the method executed by the serving cell base station according to any aspect as described above.

In another aspect, a computer program product is provided and includes instructions which, when running on a computer, cause the computer to implement the method executed by the UE according to any aspect as described above.

In another aspect, a computer program product is provided and includes instructions which, when running on a computer, cause the computer to implement the method executed by the serving cell base station according to any aspect as described above.

The beneficial effects brought by the technical solutions according to the embodiments of this application include at least followings.

UE reports the first timing difference to the serving cell base station, where the first timing difference is the difference between the first propagation delay and the second propagation delay, the first propagation delay is the propagation delay between the UE and the serving cell satellite, and the second propagation delay is the propagation delay between the UE and the neighboring cell satellite. Accordingly, the UE can measure and determine the propagation delay between the UE and the neighboring cell satellite, and report the timing difference of the neighboring cell satellite to the serving cell base station, thereby facilitating the serving cell base station to timely adjust the offset value(s) of the measurement interval and/or the SMTC configured for the neighboring cell.

BRIEF DESCRIPTION OF THE DRAWINGS

In order to illustrate the technical solutions in the embodiments of this application more clearly, the following briefly introduces the drawings that are used in the description of the embodiments. Obviously, the drawings in the following description are only some embodiments of this application. For those of ordinary skill in the art, other drawings can also be obtained from these drawings without creative effort.

FIG. 1 is a network architecture diagram of a pass-through payload NTN according to some embodiments of this application.

FIG. 2 is a network architecture diagram of a regeneration payload NTN according to some embodiments of this application.

FIG. 3 is a flowchart of an information reporting method according to some embodiments of this application.

FIG. 4 is a flowchart of an information reporting method according to some other embodiments of this application.

DETAILED DESCRIPTION

Figure 5:
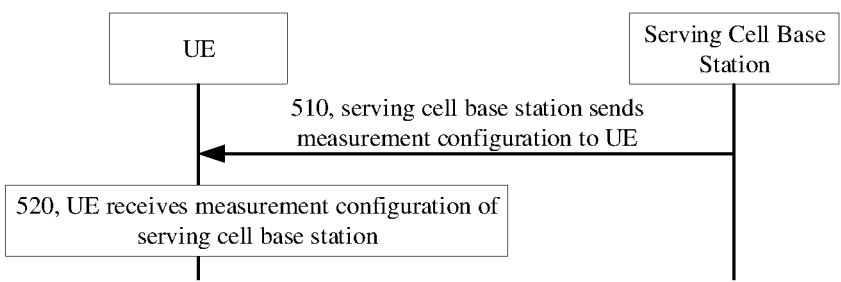
FIG. 5 is a flowchart of a method for configuring measurement parameters according to some embodiments of this application.

In order to make the objectives, technical solutions and advantages of this application clearer, embodiments of this application will be further described in detail below with reference to the accompanying drawings.

Before the information reporting method according to some embodiments of this application is introduced in detail, the related terms and implementation environment involved in the embodiments of this application are briefly introduced.

First, the related terms involved in this application are explained.

1. NTN Technology

Currently, the 3GPP (Third Generation Partnership Project) is studying NTN technology, which generally provides communication services to terrestrial users by means of satellite communication. Compared with terrestrial cellular network communication, satellite communication has many unique advantages. First of all, satellite communication is not limited by the user's geographical area. For example, general terrestrial communication cannot cover areas such as oceans, mountains, deserts, and the like, where communication equipment cannot be constructed or the communication coverage is not established due to sparse population. For satellite communication, due to a single satellite can cover a large ground, and satellites can orbit around the earth, so theoretically every corner of the earth can be covered by satellite communications. Secondly, satellite communication has great social value. Satellite communications can be covered at low cost in remote mountainous areas or poor and backward countries or regions, so that people in these regions can enjoy advanced voice communication and mobile Internet technologies, thereby narrowing the digital divide with developed regions and promoting development in these regions. Thirdly, the satellite communication distance is long, and the communication cost does not increase significantly when the communication distance increases. Finally, the satellite communication has high stability and is not limited by natural disasters.

Communication satellites may be classified into LEO (Low-Earth Orbit) satellites, MEO (Medium-Earth Orbit) satellites, GEO (Geostationary Earth Orbit) satellites, and HEO (High Elliptical Orbit) satellites according to different orbital altitudes. The main research at this stage is directed to LEO and GEO.

LEO

The altitude range of low-orbit satellites is 500 km to 1500 km, and the corresponding orbital period is about 1.5 hours to 2 hours. The signal propagation delay of single-hop communication between users is generally less than 20 ms. The maximum viewable time of satellite is 20 minutes. The signal propagation distance is short, the link loss is small, and the transmit power requirements of the user terminal are not high.

GEO

The geostationary earth orbit satellites orbit around the earth with an orbital altitude of 35,786 km and a 24-hour orbital period. The signal propagation delay of single-hop communication between users is generally 250 ms.

In order to ensure the coverage of satellites and improve the system capacity of the entire satellite communication system, satellites use multiple beams to cover the ground. A satellite can form dozens or even hundreds of beams to cover the ground; and a satellite beam can cover the ground area with tens to hundreds of kilometers in diameter.

There are at least two NTN scenarios: pass-through (or referent to as transparent transmission) payload NTN and regeneration payload NTN. FIG. 1 shows a scenario of the pass-through payload NTN, and FIG. 2 shows a scenario of the regeneration payload NTN.

An NTN network consists of the following network elements:

one or more gateways, used for connecting satellites and terrestrial public networks;

feeder link, which is the link used for communication between the gateway and the satellites;

service Link, which is the link used for communication between terminals and satellites;

satellites, which may be classified into, based on the functions they provide, two types: pass-through payload and regeneration payload;

pass-through payload, which provides the functions of radio frequency filtering, frequency conversion and amplification, and only provides transparent forwarding of the signal without changing the waveform signal it forwards;

regeneration payload, which, in addition to providing the functions of radio frequency filtering, frequency conversion and amplification, can also provide the functions of demodulation/decoding, routing/conversion, and encoding/modulation, and has part or all of the functions of a base station; and ISL (Inter-satellite rs), which exists in the scenario of regeneration payload.

2. NR Measurement

The measurement mainly refers to the mobility measurement in the connected state. After the base station sends the measurement configuration to the UE, the UE detects the signal quality status of the neighboring cells according to the measurement object and reporting configuration indicated in the measurement configuration, and feeds back the measurement report information to the base station, which is used by the base station to perform handover or improve the relation list of neighboring cells.

1). Measurement Configuration

In NR, the base station sends measurement configuration information to the UE in the connected state through RRC signaling, and the UE performs measurement (intra-frequency, inter-frequency, inter-RAT) according to the content of the measurement configuration information, and then reports the measurement result to the base station.

The base station uses RRC connection reconfiguration to perform measurement configuration, and the measurement configuration information includes the followings.

(1) Measurement Object

For intra-frequency measurement and inter-frequency measurement, the time-frequency position to be measured and the subcarrier spacing of the reference signal may be indicated for each measurement object. For cells related to the measurement object, the base station may configure a cell offset list.

For each measurement frequency point, the network configures an SMTC to indicate the time when the UE receives the SSB on the neighboring cell corresponding to the frequency point. The SMTC configuration includes: the period (cycle) of SMTC, the start time offset of SMTC in a period, the duration of SMTC, and the like.

(2) Reporting Configuration

Each measurement object corresponds to one or more reporting configurations. The reporting configuration includes:

reporting criterion, that is, the triggering condition for the UE to perform measurement reporting, which may include periodic-triggered reporting or event-triggered reporting.

(3) Measurement Identity

Separate IDs associate the measurement objects with the reporting configurations. A measurement object may be associated with multiple reporting configurations at the same time, and a reporting configuration may also be associated with multiple measurement objects at the same time, which are distinguished by measurement identities.

(4) Measurement Interval

It is used to indicate the time when the UE performs inter-frequency/inter-RAT measurement. The UE performs the inter-frequency/inter-RAT measurements during the measurement interval. The measurement interval configuration includes: the period of measurement interval, the start time offset of measurement interval within a period, the duration of measurement interval, and the like.

2). Measurement Report

UE performs measurement according to the measurement configuration issued by the network, and evaluates the measurement report when certain trigger conditions are met. If the reporting conditions are met, the UE fills in the measurement report and sends to the network the measurement report.

Next, the implementation environment involved in some embodiments of this application is briefly introduced.

In the current NR standard, the measurement interval is configured based on the UE, and the SMTC is configured based on the frequency point.

Compared with the cellular network adopted by traditional NR, the signal propagation delay between UE and cell satellite in NTN is greatly increased. In addition, due to the large coverage of cell satellites, the signal propagation delays between the UE and different cell satellites are also quite different.

In NTN, in order to enable the UE to receive SSBs from different cell base stations within the SMTC window, the duration of SMTC needs to be greatly extended to compensate for the large difference between the UE and different cell base stations. Also, the duration of measurement interval for the UE to perform inter-frequency/inter-RAT measurements may need to be extended. The extension of the SMTC window means that the UE has to continuously try to receive the SSB within a longer SMTC window, thereby increasing the energy consumption of the UE. The extension of the measurement interval window means that the communication time between the UE and the serving cell base station is reduced, thereby affecting the user experience.

Therefore, in order to more accurately configure to the terminal the measurement interval for the neighboring cell and/or the SMTC offset value for the neighboring cell, the serving cell base station may need to determine the signal propagation delay between the UE and the neighboring cell satellite; then determine the communication delays between the UE and different cell satellites; and configure, according to the determined propagation delay, the measurement interval and/or the SMTC offset value of the neighboring cell for the UE.

After the related terms and implementation environment involved in some embodiments of this application are introduced, the information reporting method according to some embodiments of this application will be introduced next with reference to the accompanying drawings.

FIG. 3 is a flowchart of an information reporting method according to some embodiments of this application, and the information reporting method may include the following contents.

In step 310, the UE reports a first timing difference to a serving cell base station (i.e., a based station in the serving cell), where the first timing difference is a difference between a first propagation delay and a second propagation delay, the first propagation delay is a propagation delay between the terminal and a serving cell satellite (i.e., a satellite in the serving cell), and the second propagation delay is a propagation delay between the terminal and a neighboring cell satellite (i.e., a satellite in the neighboring cell).

The UE may report the first timing difference through an RRC (Radio Resource Control) message. The UE may also use a shared channel for reporting, and the UE's identity information may be carried when reporting based on the shared channel, so that the serving cell base station can determine the first timing difference reported by the UE according to the identity information. The UE may also report the first timing difference through other resources configured by the serving cell base station. Embodiments of this application do not limit the reporting manner adopted by the UE for reporting the first timing difference.

In addition, when reporting the first timing difference, the UE may also report the satellite identity of the neighboring cell satellite corresponding to the first timing difference, so that the serving cell base station can determine the first timing difference corresponding to each neighboring cell satellite.

The first timing difference reported by the UE is used for the serving cell base station to configure the first offset value of the measurement interval for the neighboring cell, and/or for the serving cell base station to configure the second offset value of the SMTC for the neighboring cell.

It should be noted that, if the information reporting of the UE is periodic reporting, the UE starts the periodic timer every time reporting the first timing difference. When the periodic timer expires, the current timing difference value of the neighboring cell satellite is reported again, and the first timing difference is no longer reported until the maximum number of periodic reports is reached or the serving cell base station deletes the timing difference reporting configuration.

In some embodiments of this application, the UE may determine the first timing difference of the neighboring cell satellite relative to the serving cell satellite according to the first propagation delay between the UE and the serving cell satellite and the second propagation delay between the UE and the neighboring cell satellite, and report the first timing difference to the serving cell base station, thereby facilitating the serving cell base station to adjust the subsequent measurement configuration information of the UE according to the first timing difference.

Optionally, based on the information reporting method shown in FIG. 3, the UE may also report the change pattern of the first timing difference to the serving cell base station according to the determined first timing difference.

Referring to FIG. 4, which is a flowchart of an information reporting method according to some other embodiments of this application. The information reporting method may include the following contents.

In step 410, the UE reports the change pattern of the first timing difference to the serving cell base station.

Herein, the change pattern of the first timing difference includes a change cycle and a change stepsize.

In a possible implementation manner, the moving position of the UE in the serving cell does not change greatly, and the cell satellite operates based on a fixed cycle, so the distance between the cell satellite and the UE in the cell may always vary during the operation cycle. The UE collects the first timing differences in one operation cycle, determines the change pattern of the first timing difference in one operation cycle of the cell satellite. For example, the UE determines the change cycle of the first timing difference, determines the change stepsize in each change cycle, and reports the change cycle and change stepsize to the serving cell base station as the change pattern of the first timing difference. In this way, the serving cell base station can obtain, in one report, the change pattern of the first timing difference of the UE within one change cycle, thereby reducing the signaling consumption between the UE and the serving cell base station due to multiple reports of the first timing difference in the next repeated cycle.

In another possible implementation manner, not only the cell satellite are moving, but the UE is also moving, then the UE obtains at least one relative distance according to changes in relative distances between multiple locations of the UE and the serving cell satellite within a period of time, determines the timing difference corresponding to the at least one relative distance, and reports the timing difference to the serving cell base station as the change pattern of the first timing difference within this period of time. In this way, in the case that the UE moves along a track, the serving cell base station can obtain the change pattern of the first timing difference within a period of time in one report, thereby reducing the signaling consumption of repeated reporting between the UE and the serving cell.

As an example, it is assumed that the movement cycle of the satellite is 24 hours, and there is one neighboring cell satellite. Accordingly, the changes of the first timing difference in one change cycle may be as follows: the first timing difference between 1:00 and 6:00 is 1 ms; the first timing difference between 7:00 and 12:00 is 2 ms; the first timing difference between 13:00 and 18:00 is 3 ms, and the first timing difference between 19:00 and 24:00 is 4 ms. Then the reported change pattern of the first timing difference may be (6, 1), indicating that the change cycle of the timing difference of the neighboring cell satellite is 6 hours, and the change stepsize in each change cycle is 1 ms.

In addition, when reporting the change pattern of the first timing difference, the UE may also report the satellite identity of the neighboring cell satellite corresponding to the change pattern of the first timing difference, so that the serving cell base station can determine the change pattern of the first timing difference corresponding to each neighboring cell satellite.

The change pattern of the first timing difference reported by the UE may also include other parameters, and the above description is only given by taking the change cycle and the change stepsize as an example, which does not constitute a limitation on the embodiments of this application.

In some embodiments of this application, the UE further determines the change pattern of the first timing difference according to a plurality of first timing differences determined within a period of time, and reports the change pattern of the first timing difference to the serving cell base station. In this way, the signaling consumption caused by the UE repeatedly reporting to the serving cell base station can be reduced, and at the same time, the serving cell base station can obtain the change of the first timing difference in one reception of the message, and adjust the subsequent measurement configuration information of the UE according to the change pattern of the first timing difference.

It should be noted that, the information reporting processes shown in FIG. 3 and FIG. 4 can be performed simultaneously or independently, which is not limited in this application.

In other words, the UE may report the change pattern of the first timing difference while reporting the first timing difference; it may also report the first timing difference within a period of time, and report the change pattern of the first timing difference within another period of time. Also, only the first timing difference may be fixedly reported, or only the change pattern of the first timing difference may be fixedly reported.

The reporting manner of the UE may be determined from the reporting configuration sent by the serving cell base station to the UE, or may be a pre-defined reporting manner, which is not limited in the embodiments of this application.

Optionally, based on the information reporting method shown in FIG. 3 or FIG. 4, the UE may report the first timing difference or the change pattern of the first timing difference according to the measurement configuration of the serving cell base station.

Referring to FIG. 5, FIG. 5 is a flowchart of a method for configuring a measurement parameter according to some embodiments of this application, and the method for configuring the measurement parameter may include at least part of the following contents.

In step 510, the serving cell base station sends the measurement configuration to the UE.

The measurement configuration is used for indicating the UE to measure the first timing difference according to the measurement configuration.

In the RRC connected state, the RRC context has been established, and the serving cell base station can send the measurement configuration to the UE in the connected state through RRC signaling, thereby indicating the UE to measure the communication delay of the serving cell.

It should be noted that the measurement configuration may also be sent to the UE in other ways, for example, through an RRC release message during RRC state switching, cell broadcast or other dedicated signaling, which is not limited in this application.

In some embodiments, the measurement configuration sent by the serving cell base station includes at least one of the following measurement parameters.

Measurement Object

The measurement object includes: the identity of the neighboring cell satellite and/or the second ephemeris information. The ephemeris refers to a table of precise positions or trajectories of the satellite that change with time in the positioning measurement. The second ephemeris information includes information such as the orbit and running speed of the neighboring cell satellite. According to the second ephemeris information, the running positions of the neighboring cells satellite at different times can be determined. There may be one or more neighboring cell satellites.

Reporting Configuration

The reporting configuration includes: one-time reporting or periodic reporting.

As an example, when the configured reporting manner is one-time reporting, the UE can report after the measurement is completed, or can report again when the serving cell base station needs the report, which is not limited in this application.

As another example, when the configured reporting manner is periodic reporting, the UE performs reporting according to a predetermined period. For example, the measurement results are reported every 1 minute.

Optionally, the reporting period and the maximum number of periodic reports may also be configured, so that the UE can know the reporting interval and when the reporting ends.

For example, if the reporting period is 1 minute and the maximum number of periodic reports is 10, the UE reports the measurement result every 1 minute, and stops reporting after 10 reports.

In addition, it should also be noted that, in step 510, the serving cell base station may separately configure a corresponding reporting configuration for each neighboring cell satellite. In this way, the serving cell base station can receive different reporting parameters for different neighboring cell satellites, thereby determining information such as the communication delay between the UE and each neighboring cell satellite. The serving cell base station can also configure a set of common reporting configurations for all neighboring cell satellites measured by the UE. In this way, the serving cell base station can determine the communication delay between the UE and each neighboring cell satellite based on the same reporting manner.

Embodiments of this application do not limit the manner of the reporting configuration configured by the serving cell base station for the UE. The UE can perform measurement and reporting according to the measurement configuration. The reporting manner and reporting time are not limited, and may be preset according to requirements.

In step 520, the UE receives the measurement configuration of the serving cell base station.

The UE receives and parses the RRC signaling sent by the serving cell base station, and determines the measurement configuration information configured for itself. Herein, the measurement configuration information includes the object on which the UE performs the measurement, and the reporting manner of the measurement result.

In some embodiments of this application, the UE obtains the measurement configuration according to the RRC signaling sent by the serving cell base station, measures the measurement object according to the measurement configuration, and reports the measurement result to the serving cell base station according to the reporting configuration.

Optionally, based on the information reporting method shown in FIG. 3 or FIG. 4, the UE may calculate and determine the first timing difference by itself, and then report the first timing difference or the change pattern of the first timing difference to the serving cell base station.

Figure 6:
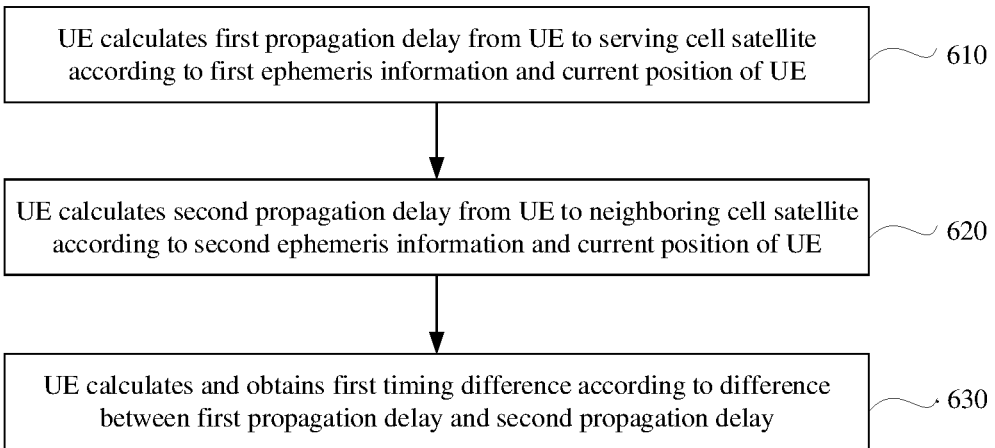
FIG. 6 is a flowchart of a method for determining timing difference according to some embodiments of this application.

Referring to FIG. 6, FIG. 6 is a flowchart of a method for determining timing difference according to some embodiments of this application, and the method for determining timing difference may include at least part of the following contents.

In step 610, the UE calculates the first propagation delay from the UE to the serving cell satellite according to the first ephemeris information and the current position of the UE.

The first ephemeris information is the ephemeris information of the serving cell satellite. The first ephemeris information includes information such as the running orbit and running speed of the serving cell satellite. According to the first ephemeris information, the running positions of the serving cell satellite at different times can be determined.

The UE is a terminal provided with a positioning function, and when the positioning function is activated on the terminal, the current specific position of the UE can be determined. The UE communicates with the serving cell base station through the serving cell satellite. After the UE is connected to the serving cell base station, the UE may store the first ephemeris information of the serving cell satellite.

In a possible implementation manner, the UE determines the current position of the serving cell satellite according to the first ephemeris information, and further determines the first distance between its own position and the current position of the serving cell satellite, and calculates a ratio of the first distance to the speed of light as the first propagation delay from the UE to the serving cell satellite.

In step 620, the UE then calculates the second propagation delay from the UE to the neighboring cell satellite according to the second ephemeris information and the current position of the UE.

Herein, the second ephemeris information is the ephemeris information of neighboring cell satellite. The second ephemeris information includes information such as the running orbit and running speed of the at least one neighboring cell satellite. According to the second ephemeris information, the running position of the at least one neighboring cell satellite at different times can be determined.

It should be noted that since the second ephemeris information includes information such as the running orbit and running speed of the at least one neighboring cell satellite, the UE may need to measure the propagation delays of multiple neighboring cell satellites.

When there is one neighboring cell, the UE may determine the current position of the neighboring cell satellite according to the second ephemeris information, further determine the second distance between its own position and the current position of the neighboring cell satellite, and calculate a ratio of the second distance to the speed of light as the second propagation delay from the UE to the neighboring cell satellite.

When the number of neighboring cells is N, and N is greater than 1, the UE may determine the current positions of satellites in multiple neighboring cells according to the second ephemeris information, further determine and obtain multiple second distances between its own position and the current positions of satellites in multiple neighboring cells, and calculate ratios of multiple second distances to the speed of light as the second propagation delays from the UE to multiple neighboring cell satellites, thereby obtaining multiple second propagation delays.

In step 630, the UE calculates and obtains the first timing difference according to the difference between the first propagation delay and the second propagation delay.

Herein, the first timing difference indicates the offset situation of the communication delay between the UE and the neighboring cell satellite relative to the communication delay between the UE and the serving cell satellite. In other words, the first timing difference reflects the communication delay after the UE switches to the neighboring cell relative to the current serving cell.

It should be noted that, the second propagation delay may be one or more than one, so the following two possible situations may exist for determining the first timing difference according to the first propagation delay and the second propagation delay.

When there is one neighboring cell, that is, there is one second propagation delay, the difference between the first propagation delay and the second propagation delay is directly determined and used as the first timing difference.

When there are N neighboring cells and N is greater than 1, that is, when there are multiple second propagation delays, the UE determines the differences between the first propagation delay and the multiple second propagation delays, and obtains multiple first timing differences. In other words, the offset situation of the propagation delays between the UE and the multiple neighboring cell satellites is determined.

In some embodiments of this application, the UE may determine the distances from the UE to the serving cell satellite and at least one neighboring cell satellite according to the ephemeris information and the position information of its own location, and determine the propagation delays of the communication according to the distances, thereby determining the propagation delays between the UE and satellites in different neighboring cells.

Optionally, based on the methods shown in FIG. 3 to FIG. 6 above, the UE can measure the propagation delays between the UE and the serving cell satellite, as well as between the UE and the neighboring cell satellite, according to the measurement configuration configured by the serving cell base station, determine the first timing difference according to the propagation delays, report the first timing difference to the serving cell base station.

Figure 7:
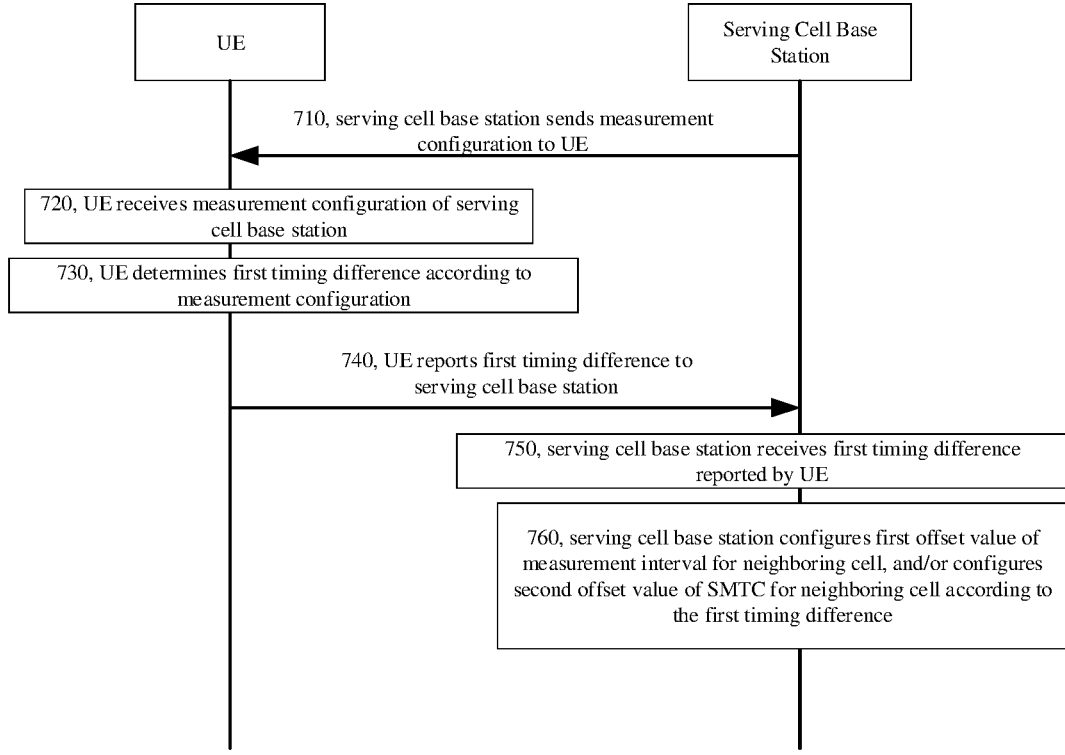
FIG. 7 is a flowchart of an information reporting method according to some other embodiments of this application.

Accordingly, referring to FIG. 7, which is a flowchart of an information reporting method according to some other embodiments of this application, the information reporting method may include at least part of the following contents.

In step 710, the serving cell base station sends the measurement configuration to the UE.

The measurement configuration is used for indicating the UE to measure the first timing difference according to the measurement configuration, and the measurement configuration includes at least one of the following measurement parameters:

Measurement object, including the identity and/or the second ephemeris information of the neighboring cell satellite. The second ephemeris information includes information such as the running orbit and running speed of the neighboring cell satellite. According to the second ephemeris information, the running positions of the neighboring cell satellite at different times can be determined. There may be one or more neighboring cell satellites.

Report configuration, including one-time reporting or periodic reporting.

In a possible implementation manner, the serving cell base station may send the measurement configuration to the corresponding UE through RRC signaling.

In step 720, the UE receives the measurement configuration of the serving cell base station.

The UE receives and parses the RRC signaling sent by the serving cell base station, and determines the measurement configuration information configured for itself. In some embodiments, the measurement configuration information includes the object on which the UE performs the measurement, and the reporting manner of the measurement result.

In step 730, the UE determines the first timing difference according to the measurement configuration.

The UE determines the measurement object according to the measurement configuration, where the measurement object includes second ephemeris information of at least one neighboring cell satellite. The second ephemeris information includes information such as the running orbit and running speed of the neighboring cell satellite. According to the second ephemeris information, the running positions of the neighboring cell satellite at different times can be determined.

The UE is a terminal provided with a positioning function, and when the positioning function is activated on the terminal, the current specific position of the UE can be determined. The UE communicates with the serving cell base station through the serving cell satellite. After the UE is connected to the serving cell base station, the UE may store the first ephemeris information of the serving cell satellite.

Therefore, in a possible implementation manner, the implementation process of the UE measuring the first timing difference according to the measurement configuration may include: calculating the first propagation delay from the UE to the serving cell satellite according to the first ephemeris information and the current position of the UE; calculating the second propagation delay from the UE to the neighboring cell satellite according to the second ephemeris information and the current position of the UE; and obtaining the first timing difference by calculating the difference between the first propagation delay and the second propagation delay.

In step 740, the UE reports the first timing difference to the serving cell base station.

The UE may report the first timing difference through an RRC message. The UE may also use a shared channel for reporting, and the UE's identity information may be carried when reporting based on the shared channel, so that the serving cell base station can determine the first timing difference reported by the UE according to the identity information. The UE may also report the first timing difference through other resources configured by the serving cell base station. Embodiments of this application do not limit the reporting manner adopted by the UE for reporting the first timing difference.

In some embodiments, when reporting the first timing difference, the UE also reports the satellite identity of the neighboring cell satellite corresponding to the first timing difference, so that the serving cell base station can determine the first timing difference corresponding to each neighboring cell satellite.

Based on step 740, the UE may determine the change pattern of the first timing difference after multiple measurements, and report the change pattern to the serving cell base station.

In other words, the above step 740 may also be replaced with: the UE reports the change pattern of the first timing difference to the serving cell base station, and the change pattern includes a change cycle and a change stepsize.

Similarly, when reporting the change pattern of the first timing difference, the UE also reports the satellite identity of the neighboring cell satellite corresponding to the change pattern of the first timing difference, so that the serving cell base station can determine the change pattern of the first timing difference corresponding to each neighboring cell satellite.

It should be noted that the change pattern of the first timing difference reported by the UE may also include other parameters, and the above only takes the change cycle and the change stepsize as an example for explanation, which does not constitute a limitation to the embodiments of this application.

In step 750, the serving cell base station receives the first timing difference reported by the UE.

The first timing difference is the difference between the first propagation delay and the second propagation delay, the first propagation delay is the propagation delay between the UE and the serving cell satellite, and the second propagation delay is the propagation delay between the UE and the neighboring cell satellite.

Optionally, the above step 750 may also be replaced by: receiving the change pattern of the first timing difference reported by the UE, where the change pattern includes the change cycle and the change stepsize.

In step 760, the serving cell base station configures the first offset value of the measurement interval for the neighboring cell, and/or configures the second offset value of the SMTC for the neighboring cell according to the first timing difference.

In the process that the UE communicates with the serving cell base station through the serving cell satellite, the communication duration includes the communication duration on the service link and the communication duration on the feeder link. Therefore, in order to accurately configure the first offset value of the measurement interval for the neighboring cell, and/or, the second offset value of the SMTC for the neighboring cell, not only the first timing difference existing between the UE and the neighboring cell satellite, but also the second timing difference on the feeder link between the neighboring cell satellite and the neighboring cell base station may need to be considered.

Herein, the second timing difference is the difference between the third propagation delay and the fourth propagation delay, the third propagation delay is the propagation delay on the feeder link between the serving cell satellite and the serving cell base station, and the fourth propagation delay is the propagation delay on the feeder link between the neighboring cell satellite and the neighboring cell base station.

In a possible implementation manner, the implementation process of determining the second timing difference may be as follows. The serving cell base station calculates the third propagation delay from the serving cell base station to the serving cell satellite according to the first ephemeris information and its own current position, then calculates the fourth propagation delay from the serving cell base station to the neighboring cell satellite according to the second ephemeris information and the current position of the serving cell base station, and obtains the second timing difference by calculating the difference between the third propagation delay and the fourth propagation delay. The sum of the first timing difference and the at least one second timing difference is determined as the communication delay offset of the neighboring cell.

The first ephemeris information is the ephemeris information of the serving cell satellite, and the second ephemeris information is the ephemeris information of the neighboring cell satellite. The ephemeris information includes information such as the running orbit and running speed of the cell satellites. According to the ephemeris information, the running positions of the cell satellites at different times can be determined.

It should be noted the first timing difference or the change pattern of the first timing difference may be measured and reported by the UE. Therefore, there are the following two possible implementation manners for determining the first offset value of the measurement interval and/or the second offset value of the SMTC for the neighboring cell.

In a possible implementation manner, the serving cell base station configures the first offset value of the measurement interval for the neighboring cell, and/or configures the second offset value of the SMTC for the neighboring cell according to the first timing difference and the second timing difference.

In another possible implementation manner, the serving cell base station configures the first offset value of the measurement interval for the neighboring cell, and/or configures the second offset value of the SMTC for the neighboring cell according to the change pattern of the first timing difference and the second timing difference.

As an example, when configuring the first offset value of the measurement interval for the neighboring cell, and/or when configuring the second offset value of the SMTC for the neighboring cell, it should be ensured that the duration of the measurement interval and the SMTC configuration is greater than the communication delay. In other words, when the serving cell base station configures the first offset value for the measurement interval of the neighboring cell, it needs to add the above-mentioned communication delay difference based on the measurement interval of the serving cell. Similarly, when the serving cell base station configures the second offset value of the SMTC for the neighboring cell, it needs to add the communication delay difference based on the offset value of the SMTC of the serving cell. In this way, the measurement effect of RRM can be guaranteed.

Optionally, based on the above step 760, since the satellite is moving, the relative distance between the serving cell satellite and the serving cell base station may also change, and the relative distance between the neighboring cell satellite and the neighboring cell base station may also change. Therefore, the serving cell base station may further determine the change pattern of the propagation delay on the feeder link of the neighboring cell satellite according to the first ephemeris information and the second ephemeris information.

In other words, the change pattern of the propagation delay of the serving cell satellite on its feeder link is determined according to the first ephemeris information, and the second propagation delay of the neighboring cell satellite on its feeder link is determined according to the second ephemeris information.

Further, the serving cell base station configures the first offset value of the measurement interval for the neighboring cell, and/or configures the second offset value of the SMTC for the neighboring cell according to the first timing difference and the change pattern of the second propagation delay reported by the UE.

Alternatively, the serving cell base station configures the first offset value of the measurement interval for the neighboring cell, and/or configures the second offset value of the SMTC for the neighboring cell according to the change pattern of the first timing difference and the change pattern of the second propagation delay reported by the UE.

In a wireless communication system, in order to optimize system performance and capacity, it is necessary to allocate and manage limited wireless resources. The allocation and management of radio resources are usually performed according to the results of RRM (Radio Resource Management) measurements. The measurement of RRM requires the corresponding measurement interval being configured, that is, the duration of the measurement interval and/or the duration of the SMTC needs to be determined, so that the above duration is as small as possible, thereby performing the measurement without affecting the data transmission efficiency. However, in order to ensure the measurement effect, the above-mentioned duration may need to ensure that the UE can measure the reference signal.

It should be noted that this application is only directed to determining the first offset value of the measurement interval for the neighboring cell, and/or configuring the second offset value of the SMTC for the neighboring cell according to the first timing difference reported by the UE, but the measurement process of the RRM is not repeated here.

To sum up, in the method according to some embodiments of this application, the UE reports the first timing difference to the serving cell base station, where the first timing difference is the difference between the first propagation delay and the second propagation delay, the first propagation delay is the propagation delay between the UE and the serving cell satellite, and the second propagation delay is the propagation delay between the UE and the neighboring cell satellite. Accordingly, the UE can measure and determine the propagation delay of the neighboring cell satellite, and report the timing difference of the neighboring cell satellite to the serving cell base station, thereby facilitating the serving cell base station to timely adjust the offset values of the measurement interval and/or the SMTC configured for the neighboring cell.

Figure 8:
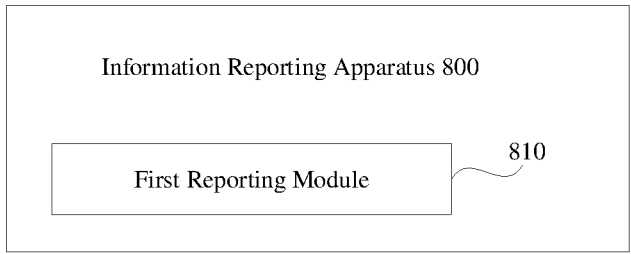
FIG. 8 is a block diagram of an information reporting apparatus according to some embodiments of this application.

FIG. 8 is a block diagram of an information reporting apparatus according to some embodiments. The apparatus 800 may be a UE, or be implemented as a part of the UE. The apparatus 800 includes a first reporting module 810.

The first reporting module 810 is configured to report a first timing difference from the UE to a serving cell base station, where the first timing difference is a difference between a first propagation delay and a second propagation delay, the first propagation delay is a propagation delay between the terminal and a serving cell satellite, and the second propagation delay is a propagation delay between the terminal and a neighboring cell satellite.

Optionally, the first timing difference is used for the serving cell base station to configure a first offset value for the measurement interval of the neighboring cell, and/or used for the serving cell base station to configure a second offset value for the SMTC of the neighboring cell.

Optionally, the apparatus 800 further includes:

a receiving module 820, configured to receive a measurement configuration of the serving cell base station at the UE; and a measurement module 830, configured to determine the first timing difference according to the measurement configuration at the UE.

Optionally, the measurement configuration includes at least one of the following measurement parameters:

a measurement object; or a reporting configuration;

where the measurement object includes an identity of the neighboring cell satellite and/or second ephemeris information, and the reporting configuration includes one-time reporting or periodic reporting.

Optionally, the measurement module 830 includes:

a first calculation module, configured to calculate the first propagation delay from the UE to the serving cell satellite according to first ephemeris information and a current position of the UE, wherein the first ephemeris information is ephemeris information of the serving cell satellite;

a second calculation module, configured to calculate the second propagation delay from the UE to the neighboring cell satellite according to second ephemeris information and the current position of the UE, wherein the second ephemeris information is ephemeris information of the neighboring cell satellite; and a third calculation module, configured to calculate the first timing difference according to a difference between the first propagation delay and the second propagation delay.

Optionally, the apparatus 800 further includes:

a second reporting module, configured to report a change pattern of the first timing difference from the UE to the serving cell base station, where the change pattern includes a change cycle and a change stepsize.

In some embodiments of this application, according to the method provided by some embodiments of this application, the UE reports the first timing difference to the serving cell base station, where the first timing difference is the difference between the first propagation delay and the second propagation delay, the first propagation delay is the propagation delay between the UE and the serving cell satellite, and the second propagation delay is the propagation delay between the UE and the neighboring cell satellite. Accordingly, the UE can measure and determine the propagation delay between the UE and the neighboring cell satellite, and report the timing difference of the neighboring cell satellite to the serving cell base station, thereby facilitating the serving cell base station to timely adjust the offset value(s) of the measurement interval and/or the SMTC configured for the neighboring cell.

Figure 9:
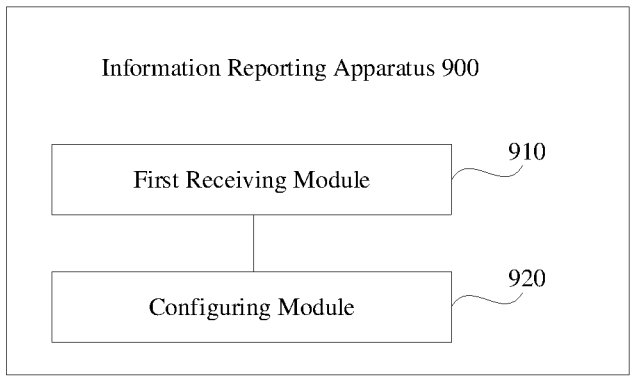
FIG. 9 is a block diagram of an information reporting apparatus according to some other embodiments of this application.

FIG. 9 is a block diagram of an information reporting apparatus according to some other embodiments. The apparatus may be implemented as a base station or a part of the base station. The apparatus 900 includes a first receiving module 910 and a configuring module 920.

The first receiving module 910 is configured to receive, at the serving cell base station, a first timing difference reported by the UE, where the first timing difference is a difference between a first propagation delay and a second propagation delay, the first propagation delay is a propagation delay between the UE and a serving cell satellite, and the second propagation delay is a propagation delay between the UE and a neighboring cell satellite.

The configuring module 920 is configured to configure, according to the first timing difference, a first offset value for the measurement interval of the neighboring cell and/or a second offset value for the SMTC of the neighboring cell.

Optionally, the apparatus 900 further includes:
a sending module 930, configured to send a measurement configuration to the UE, where the measurement configuration is used for indicating the UE to measure the first timing difference according to the measurement configuration.

Optionally, the measurement configuration includes at least one of the following measurement parameters:
a measurement object; or
a reporting configuration;
where the measurement object includes an identity of the neighboring cell satellite and/or second ephemeris information, and the reporting configuration includes one-time reporting or periodic reporting.

Optionally, the configuring module 920 is further configured to:
configure, according to the first timing difference and a second timing difference, the first offset value for the measurement interval of the neighboring cell and/or the second offset value for the SMTC of the neighboring cell;
where the second timing difference is a difference between a third propagation delay and a fourth propagation delay, the third propagation delay is a propagation delay of the serving cell satellite on its feeder link, and the fourth propagation delay is a propagation delay of the neighboring cell satellite on its feeder link.

Optionally, the apparatus 900 further includes:
a second receiving module 940, configured to receive a change pattern of the first timing difference reported by the UE, where the change pattern includes a change cycle and a change stepsize.

Optionally, the configuring module 920 is further configured to:
configure, according to the change pattern of the first timing difference, the first offset value for the measurement interval of the neighboring cell and/or the second offset value for the SMTC of the neighboring cell.

In some embodiments of this application, the serving cell base station receives the first timing difference reported by the UE, configures the first offset value of the measurement interval for the neighboring cell and/or the second offset value of the SMTC for the neighboring cell according to the first timing difference. The first timing difference is the difference between the first propagation delay and the second propagation delay, the first propagation delay is the propagation delay between the UE and the serving cell satellite, and the second propagation delay is the propagation delay between the UE and the serving cell satellite. Accordingly, the serving cell base station can configure the first offset value of the measurement interval for the neighboring cell, and/or configure the second offset value of the SMTC for the neighboring cell according to the first timing difference reported by the UE, so as to perform RRM measurement more effectively, thereby achieving better allocation and management of radio resources.

Figure 10:
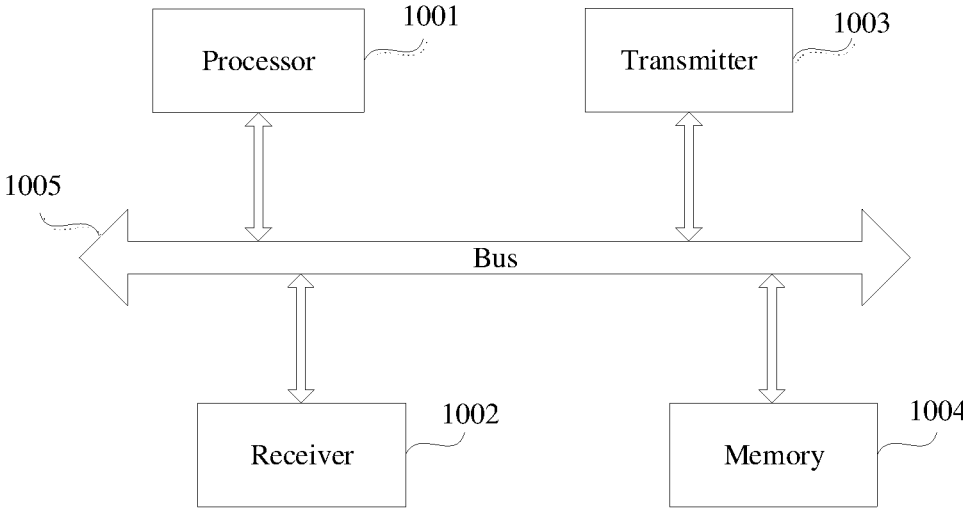
FIG. 10 is a block diagram of a communication device according to some embodiments of this application.

Referring to FIG. 10, which shows a block diagram of a communication device (terminal UE or base station) according to some embodiments of this application. The communication device includes: a processor 1001, a receiver 1002, a transmitter 1003, a memory 1004, and a bus 1005.

The processor 1001 includes one or more processing cores, and the processor 801 executes various functional applications and information processing by running software programs and modules.

The receiver 1002 and the transmitter 1003 may be implemented as a communication component, which may be a communication chip.

The memory 1004 is connected to the processor 1001 through the bus 1005.

The memory 1004 may be configured to store at least one instruction, and the processor 1001 is configured to execute the at least one instruction to implement various steps of information reporting performed by any communication device in the foregoing method embodiments.

In addition, the memory 1004 can be implemented by any type of volatile or non-volatile storage device or a combination thereof, the volatile or non-volatile storage device includes but is not limited to: magnetic disk or optical disk, EEPROM (Electrically Erasable Programmable read only memory), EPROM (Erasable Programmable Read-Only Memory), SRAM (Static Random Access Memory), ROM (Read Only Memory), magnetic memory, flash memory, and PROM (Programmable Read-Only Memory).

This application provides a computer-readable storage medium, where at least one instruction is stored in the storage medium, and the at least one instruction is loaded and executed by the processor to implement the information reporting method provided by each of the foregoing method embodiments.

This application also provides a computer program product, which, when running on the computer, enables the computer to execute the information reporting methods provided by the above method embodiments.

Those skilled in the art should realize that, in one or more of the above examples, the functions described in the embodiments of this application may be implemented by hardware, software, firmware, or any combination thereof. When implemented in software, the functions may be stored on or transmitted over as one or more instructions or codes on a computer-readable medium. The computer-readable medium includes both the computer storage medium and communication medium including any medium that facilitates transfer of a computer program from one place to another. The storage medium may be any available medium that can be accessed by a general purpose or special purpose computer.

The above descriptions are only optional embodiments of this application, and are not intended to limit this application. Any modifications, equivalent replacements, improvements and the like made within the spirit and principles of this application shall be included in the protection scope of this application.

What is claimed is:

1. An information reporting method, comprising:

reporting, by a terminal, a first timing difference to a serving cell base station, wherein the first timing difference is a difference between a first propagation delay and a second propagation delay, the first propagation delay is a propagation delay between the terminal and a serving cell satellite, and the second propagation delay is a propagation delay between the terminal and a neighboring cell satellite, wherein the first timing difference is used by the serving cell base station to configure, according to the first timing difference and a second timing difference, an offset value for a synchronization block measurement timing configuration (SMTC) of the neighboring cell, wherein the second timing difference is a difference between a third propagation delay and a fourth propagation delay, the third propagation delay is a propagation delay of the serving cell satellite on a feeder link, and the fourth propagation delay is a propagation delay of the neighboring cell satellite on the feeder link.

2. The method as claimed in claim 1, wherein the first timing difference is further used for the serving cell base station to configure a first offset value for a measurement interval of a neighboring cell.

3. The method as claimed in claim 1, further comprising:

receiving, by the terminal, a measurement configuration of the serving cell base station; and determining, by the terminal, the first timing difference according to the measurement configuration.

4. The method as claimed in claim 3, wherein the measurement configuration comprises at least one of following measurement parameters:

a measurement object; or a reporting configuration;

wherein the measurement object comprises an identity of the neighboring cell satellite and/or second ephemeris information, and the reporting configuration comprises one-time reporting or periodic reporting.

5. The method as claimed in claim 3, wherein determining, by the terminal, the first timing difference according to the measurement configuration comprises:

calculating the first propagation delay from the terminal to the serving cell satellite according to first ephemeris information and a current position of the terminal, wherein the first ephemeris information is ephemeris information of the serving cell satellite;

calculating the second propagation delay from the terminal to the neighboring cell satellite according to second ephemeris information and the current position of the terminal, wherein the second ephemeris information is ephemeris information of the neighboring cell satellite; and calculating the first timing difference according to a difference between the first propagation delay and the second propagation delay.

6. An information reporting method, comprising:

receiving, by a serving cell base station, a first timing difference reported by a terminal, wherein the first timing difference is a difference between a first propagation delay and a second propagation delay, the first propagation delay is a propagation delay between the terminal and a serving cell satellite, and the second propagation delay is a propagation delay between the terminal and a neighboring cell satellite; and configuring, according to the first timing difference and a second timing difference, an offset value for a synchronization block measurement timing configuration (SMTC) of the neighboring cell, wherein the second timing difference is a difference between a third propagation delay and a fourth propagation delay, the third propagation delay is a propagation delay of the serving cell satellite on a feeder link, and the fourth propagation delay is a propagation delay of the neighboring cell satellite on the feeder link.

7. The method as claimed in claim 6, further comprising:

sending a measurement configuration to the terminal, wherein the measurement configuration is used for indicating the terminal to determine the first timing difference according to the measurement configuration.

8. The method as claimed in claim 7, wherein the measurement configuration comprises at least one of following measurement parameters:

a measurement object; or a reporting configuration;

wherein the measurement object comprises an identity of the neighboring cell satellite and/or second ephemeris information, and the reporting configuration comprises one-time reporting or periodic reporting.

9. The method as claimed in claim 6, further comprising:

receiving a change pattern of the first timing difference reported by the terminal, wherein the change pattern comprises a change cycle and a change stepsize.

10. A terminal, comprising a transceiver, a processor and a memory, wherein the memory stores at least one instruction, and the at least one instruction is used for being executed by the processor to report, via the transceiver, a first timing difference to a serving cell base station, wherein the first timing difference is a difference between a first propagation delay and a second propagation delay, the first propagation delay is a propagation delay between the terminal and a serving cell satellite, and the second propagation delay is a propagation delay between the terminal and a neighboring cell satellite, wherein the first timing difference is used by the serving cell base station to configure, according to the first timing difference and a second timing difference, an offset value for a synchronization block measurement timing configuration (SMTC) of the neighboring cell, wherein the second timing difference is a difference between a third propagation delay and a fourth propagation delay, the third propagation delay is a propagation delay of the serving cell satellite on a feeder link, and the fourth propagation delay is a propagation delay of the neighboring cell satellite on the feeder link.

11. The terminal as claimed in claim 10, wherein the first timing difference is further used for the serving cell base station to configure a first offset value for a measurement interval of a neighboring cell.

12. The terminal as claimed in claim 10, wherein the processor is further configured to:

receive, via the transceiver, a measurement configuration of the serving cell base station; and determine the first timing difference according to the measurement configuration.

13. The terminal as claimed in claim 12, wherein the measurement configuration comprises at least one of following measurement parameters:

a measurement object; or a reporting configuration;

wherein the measurement object comprises an identity of the neighboring cell satellite and/or second ephemeris information, and the reporting configuration comprises one-time reporting or periodic reporting.

14. The terminal as claimed in claim 12, wherein the processor is further configured to:

calculate the first propagation delay from the terminal to the serving cell satellite according to first ephemeris information and a current position of the terminal, wherein the first ephemeris information is ephemeris information of the serving cell satellite;

calculate the second propagation delay from the terminal to the neighboring cell satellite according to second ephemeris information and the current position of the terminal, wherein the second ephemeris information is ephemeris information of the neighboring cell satellite; and calculate the first timing difference according to a difference between the first propagation delay and the second propagation delay.

15. A base station, comprising a transceiver, a processor and a memory, wherein the memory stores at least one instruction, and the at least one instruction is used for being executed by the processor to implement steps of the method as claimed in claim 6.

16. The base station as claimed in claim 15, wherein the processor is further configured to:

send, via the transceiver, a measurement configuration to the terminal, wherein the measurement configuration is used for indicating the terminal to determine the first timing difference according to the measurement configuration.

17. The base station as claimed in claim 16, wherein the measurement configuration comprises at least one of following measurement parameters:

a measurement object; or a reporting configuration;

wherein the measurement object comprises an identity of the neighboring cell satellite and/or second ephemeris information, and the reporting configuration comprises one-time reporting or periodic reporting.

18. The base station as claimed in claim 15, wherein the processor is further configured to:

receive, via the transceiver, a change pattern of the first timing difference reported by the terminal, wherein the change pattern comprises a change cycle and a change stepsize.

* * * * *